United States Patent
Kulik et al.

(10) Patent No.: US 10,609,288 B1
(45) Date of Patent: Mar. 31, 2020

(54) ROLL COMPENSATION AND BLUR REDUCTION IN TIGHTLY SYNCHRONIZED OPTICAL IMAGE STABILIZATION (OIS)

(71) Applicant: QUALCOMM Incorporated, San Diego, CA (US)

(72) Inventors: Victor Kulik, San Jose, CA (US); Mehul Soman, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/291,977

(22) Filed: Mar. 4, 2019

(51) Int. Cl.
*G03B 17/00* (2006.01)
*H04N 5/232* (2006.01)
*H04N 5/225* (2006.01)

(52) U.S. Cl.
CPC ..... *H04N 5/23287* (2013.01); *H04N 5/22521* (2018.08); *H04N 5/23267* (2013.01); *H04N 5/23274* (2013.01)

(58) Field of Classification Search
USPC .......................................................... 396/55
See application file for complete search history.

(56) References Cited

U.S. PATENT DOCUMENTS

| | | | |
|---|---|---|---|
| 6,282,376 B1* | 8/2001 | Shiomi .................... | G03B 5/00 396/55 |
| 10,412,306 B1* | 9/2019 | Soman ............... | H04N 5/23258 |
| 2008/0030587 A1* | 2/2008 | Helbing .................... | G06T 5/50 348/208.4 |
| 2009/0219402 A1* | 9/2009 | Schneider ............. | G03B 17/00 348/208.7 |
| 2010/0149368 A1* | 6/2010 | Yamashita .......... | H04N 5/23238 348/222.1 |
| 2017/0208251 A1* | 7/2017 | Shamir ................ | G06K 9/0063 |
| 2019/0098217 A1* | 3/2019 | Zhou .................... | H04N 5/2329 |
| 2019/0132516 A1* | 5/2019 | Li ....................... | H04N 5/23258 |
| 2019/0158744 A1* | 5/2019 | Saito ................... | H04N 5/23264 |

* cited by examiner

*Primary Examiner* — Rodney E Fuller
(74) *Attorney, Agent, or Firm* — Kilpatrick Townsend & Stockton, LLP

(57) ABSTRACT

The positioning of an adjustable lens in a camera assembly is synchronized with the capture of an image frame by the image sensor and the position of the adjustable lens is optimized to reduce the amount of blur caused by rotation of the camera assembly over the course of a frame. More specifically, techniques provide for moving the lens to a plurality of optimized positions, relative to the image sensor, over the course of a frame, to reduce motion blur in an image due to pitch, yaw, and/or roll motion of the camera assembly during the frame. Some embodiments may provide for "tight" synchronization in cases where the plurality of optimized positions are based on a time-dependent function that takes into account the rows of the image sensor being exposed over the course of the frame.

40 Claims, 11 Drawing Sheets

ROLL COMPENSATION AND BLUR REDUCTION IN TIGHTLY SYNCHRONIZED OPTICAL IMAGE STABILIZATION (OIS)

BACKGROUND

Optical Image Stability (OIS) techniques improve the performance of camera assemblies by counteracting image blur due to camera unsteadiness or jitter and/or to compensate for rolling shutter distortions during image capture. This may be particularly important for camera assemblies incorporated into handheld devices such as mobile phones and tablet computing devices for still or video images. OIS techniques utilize one or more actuators coupled with a camera lens and/or an image sensor of the camera assembly that translate, tilt, and/or rotate the lens and/or sensor relative to the camera assembly in at least one of the pitch, roll, and yaw directions. As such, OIS techniques may largely or completely compensate for effects of camera motion, including rotation (that may be measured gyroscopically, for example) and translation (that may be measured by an accelerometer, for example) and/or rolling shutter effects.

Implementing these OIS techniques in a camera assembly, however, is not without its trade-offs. Due to power, size, cost, and/or other limiting constraints, some camera systems may have limited OIS functionality. Techniques for improving OIS functionality in these limited systems, therefore, can increase the user experience of such limited-capability camera systems.

SUMMARY

Techniques described herein can address these and other issues by synchronizing the positioning of an adjustable lens in a camera assembly with the capture of an image frame by the image sensor and optimizing the position of the adjustable lens to reduce the amount of blur caused by rotation of the camera assembly over the course of a frame. More specifically, techniques provide for moving the lens to a plurality of optimized positions, relative to the image sensor, over the course of a frame, to reduce motion blur in an image due to pitch, yaw, and/or roll motion of the camera assembly during the frame. Some embodiments may provide for "tight" synchronization in cases where the plurality of optimized positions are based on a time-dependent function that takes into account when each row of the image sensor is being exposed over the course of the frame.

An example method of providing synchronized optical image stabilization in a camera assembly having an adjustable lens, according to the description, for an image sensor of the camera assembly with sensor elements disposed in rows oriented in a direction along an first axis and columns oriented in a direction along a second axis, obtaining information indicative of the beginning of a frame of the image sensor, wherein the frame comprises a period of time having an exposure period followed by a readout period in which exposure values are read from the sensor elements row by row. The method further comprises, for each time of a plurality of times during the frame, obtaining respective movement data indicative of rotation or translation of the camera assembly corresponding to the respective time, determining a respective value of a time-dependent function based at least in part on the information indicative of the beginning of the frame, wherein the respective value of the time-dependent function is dependent on the respective time in relation to the frame, and causing the adjustable lens to be moved to a respective position relative to the image sensor during the frame, wherein the respective position is based on the respective movement data and the respective value of the time-dependent function.

An example camera assembly with optical image stabilization, according to the description, comprises a controller configured to be communicatively coupled with an image sensor of the camera assembly with sensor elements disposed in rows oriented in a direction along an first axis and columns oriented in a direction along a second axis, one or more actuators configured to move an adjustable lens that focuses light onto the image sensor, and a motion sensor. The controller is configured to obtain information indicative of the beginning of a frame of the image sensor, wherein the frame comprises a period of time having an exposure period followed by a readout period in which exposure values are read from the sensor elements row by row, and, for each time of a plurality of times during the frame obtain respective movement data, from the motion sensor, indicative of rotation or translation of the camera assembly corresponding to the respective time, determine a respective value of a time-dependent function based at least in part on the information indicative of the beginning of the frame, wherein the respective value of the time-dependent function is dependent on the respective time in relation to the frame, and move, with the one or more actuators, the adjustable lens to a respective position relative to the image sensor during the frame, wherein the respective position is based on the respective movement data and the respective value of the time-dependent function.

An example apparatus, according to the description, comprises means for obtaining, for an image sensor of a camera assembly with sensor elements disposed in rows oriented in a direction along an first axis and columns oriented in a direction along a second axis, information indicative of the beginning of a frame of the image sensor, wherein the frame comprises a period of time having an exposure period followed by a readout period in which exposure values are read from the sensor elements row by row. The example apparatus further comprises means for, for each time of a plurality of times during the frame obtaining respective movement data indicative of rotation or translation of the camera assembly corresponding to the respective time, determining a respective value of a time-dependent function based at least in part on the information indicative of the beginning of the frame, wherein the respective value of the time-dependent function is dependent on the respective time in relation to the frame, and causing an adjustable lens to be moved to a respective position relative to the image sensor during the frame, wherein the respective position is based on the respective movement data and the respective value of the time-dependent function.

An example non-transitory computer-readable medium, according to the description, includes instructions embedded thereon for providing synchronized optical image stabilization in a camera assembly having an adjustable lens. The instructions, when executed by one or more processing units, cause the one or more processing units to for an image sensor of the camera assembly with sensor elements disposed in rows oriented in a direction along an first axis and columns oriented in a direction along a second axis, obtain information indicative of the beginning of a frame of the image sensor, wherein the frame comprises a period of time having an exposure period followed by a readout period in which exposure values are read from the sensor elements row by row, and, for each time of a plurality of times during the frame obtain respective movement data indicative of rotation or translation of the camera assembly corresponding to the respective time, determine a respective value of a time-dependent function based at least in part on the information indicative of the beginning of the frame, wherein the respective value of the time-dependent function is dependent on the respective time in relation to the frame, and cause the adjustable lens to be moved to a respective position relative to the image sensor during the frame, wherein the respective position is based on the respective movement data and the respective value of the time-dependent function.

BRIEF DESCRIPTION OF THE DRAWINGS

FIG. 11 is a frame graph showing how the image sensor may capture an image frame, according to an embodiment;

Figure 1:
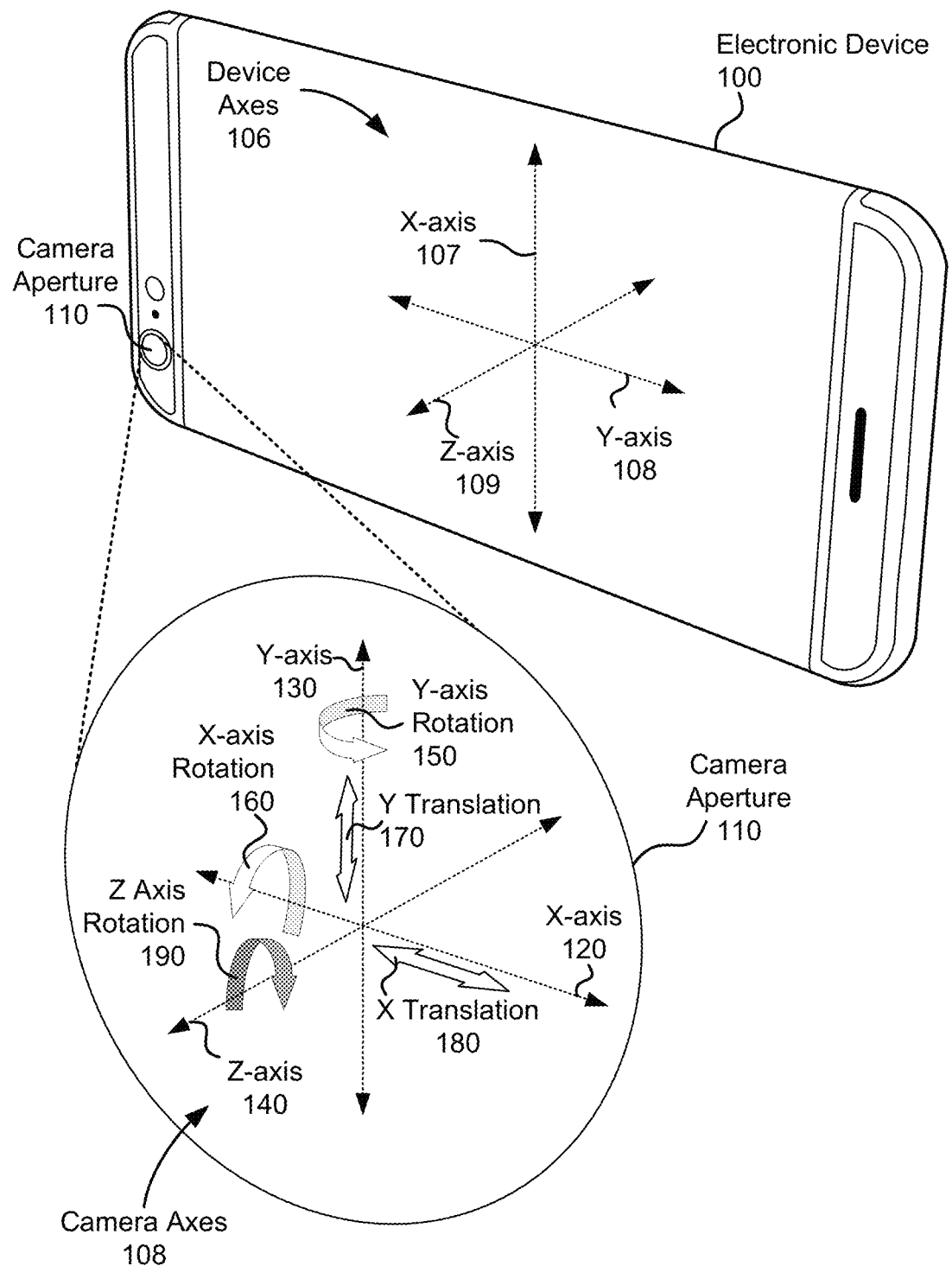
FIG. 1 is a diagram of an electronic device with a camera assembly, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims. Additionally, the described embodiments may be implemented in any device, apparatus, or system that incorporates a camera, such as mobile telephones, multimedia Internet enabled cellular telephones, mobile television receivers, wireless devices, smartphones, wearable devices, personal data assistants (PDAs), wireless electronic mail receivers, hand-held or portable computers, tablets, cameras, digital media players (such as MP3 players), camcorders, game consoles, wrist watches, mobile health devices, and so forth, as well as larger systems (e.g., automobiles, smart buildings, etc.) that incorporates such electronics.

It can be noted that, as used herein, the terms "image frame" and "frame" refer to a period of time in which an image is captured from an image sensor (e.g., a CMOS sensor). This includes an exposure period in which photosensitive sensor elements of the image sensor are configured to sense light and produce a corresponding value (e.g., a voltage) indicative of and amount of light sensed during the exposure period, and a readout period in which exposure values of the sensor elements are read and processed by image processing circuitry. For rolling-shutter cameras, the exposure values of the sensor elements are read out a row at a time (row-by-row) over the course of the readout period.

It can be additionally noted that, as a matter of convention, an image sensor as described in the embodiments herein is described with regard to a coordinate frame having mutually-orthogonal x, y, and z axes, where rows of image sensor are aligned with an x axis of the image sensor and columns are aligned with a y-axis of the image sensor. The optical axis of the image sensor therefore corresponds to the z-axis. The axes of the camera assembly comprising the image sensor. (This coordinate frame is illustrated in applicable figures, to help illustrate how the various figures are oriented within the coordinate frame.) The coordinate system for an electronic device incorporating the camera assembly may be the same, or may be different, depending on convention. The person of ordinary skill in the art will recognize that values of magnitude and/or angles utilized within this coordinate frame may be positive or negative, depending on the convention used. As such, variables disclosed in mathematical formulas, equations, and/or expressions provided herein may be positive or negative, depending on convention.

FIG. 1 is a diagram of an electronic device 100 with a camera assembly, according to an embodiment. A person of ordinary skill in the art will appreciate that, although a mobile phone is pictured as the electronic device 100, a variety of alternative devices may also have a camera assembly and may therefore utilize techniques for optical image stabilization (OIS) described herein. In this example, the coordinate system for the electronic device 100 is different than the coordinate system of the camera assembly, as shown by device axes 104 and camera axes 106. In particular the x-axis 107 and y-axis 108 of the device axes 104 are respectively aligned with the y-axis 130 and x-axis 120 of the camera axes 108. For convention, and as previously mentioned, embodiments described herein use a coordinate frame with respect to the camera aperture 110 as illustrated by camera axes 108, with mutually orthogonal axes (the x-axis 120, the y-axis 130, and the z-axis 140). The camera aperture 110 provides an opening for light to illuminate the image sensor of a camera assembly (not shown) incorporated into the electronic device 100, where the image sensor utilizes the coordinate frame of the camera axes.

Accordingly, embodiments shown in the figures and described below utilize the camera axes 108 (not the device axes 106).

In the orientation illustrated in FIG. 1, (i.e., "landscape" orientation, where rows of the image sensor along the x-axis 120 are horizontal), y-axis rotation 150 represents a change in the yaw of the electronic device 100, and x-axis rotation 160 represents a change in the pitch of the electronic device 100. (In a "portrait" orientation, where rows of the image sensor along the x-axis 120 are vertical, pitch would correspond to y-axis rotation 150 and yaw would correspond to x-axis rotation 160.) Traditional 2-axis OIS systems may provide for blur compensation due to x-axis rotation 150 and y-axis rotation 150. Traditional 4-axis is OIS systems may further provide blur compensation for y translation 170 (i.e., translation in a direction of the y-axis 130) and x translation 180 (i.e., translation in a direction of the x-axis 120).

The techniques disclosed herein provide for blur reduction due to z-axis rotation 190 and/or reduction of blur along the y-axis 130 (and, in some embodiments, blur along the x-axis 120) due to x-axis rotation 160 or x-axis translation 180. Because these techniques utilize lens displacement in a direction along the x-axis 120 and/or y-axis 130, they may be implemented by traditional 2-axis OIS systems and/or 4-axis OIS systems that are capable of such x- and y-axis lens displacement. Moreover, the techniques herein are additive, and may therefore be used simultaneously with traditional 2-axis OIS and/or 4-axis OIS. An example of a camera assembly capable of implementing the roll compensation and blur reduction techniques disclosed herein is provided in FIG. 2

Figure 2:
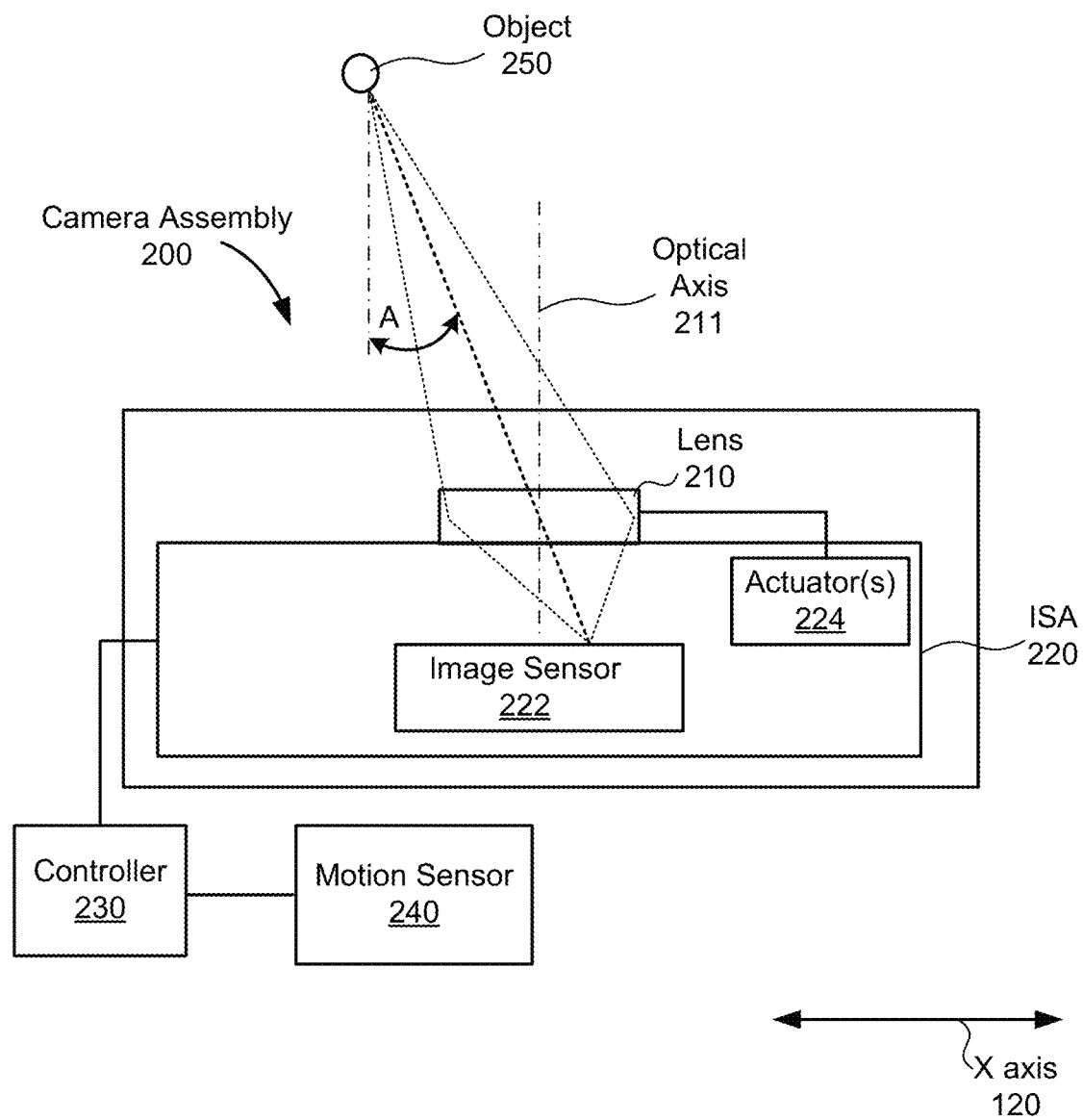
FIG. 2 is a simplified cross-sectional view of a camera assembly, according to an embodiment.

FIG. 2 is a simplified cross-sectional view of a camera assembly 200, according to an embodiment. Some or all components of the camera assembly 200 may be integrated into a larger electronic device, such as the electronic device 100 of FIG. 1. In the illustrated implementation, a camera assembly 200 includes a lens 210 and an image stabilizing arrangement (ISA) 220. The ISA 220 may include an image sensor 222 optically coupled with the lens 210 and an actuator(s) 224 mechanically coupled with the lens 210. Although only on actuator 224 is illustrated, one or more actuator(s) 224, which in some implementations may comprise a voice coil motor (VCM) actuator, may be coupled with the lens 210 and positioned to shift (or translate) the lens 210 in a direction along the x-axis 120 and/or y-axis (not shown, but orthogonal to the xz plane). Thus, actuator(s) 224 may be configured to move the lens 210 to various locations in the xy plane, orthogonal to the optical axis 211. (As previously noted, the optical axis 211 is the z-axis 140.) In some embodiments, one or more actuators additionally or alternatively may be used to translate the image sensor 222 with respect to the lens 210 in a similar manner. (Other embodiments may be additionally capable of translating the lens 210 and/or image sensor 222 along the optical axis 211 and/or rotating the lens 210 and/or image sensor 222, depending on the type of OIS implemented.) In some embodiments, the camera assembly 200 may include an adjustable aperture (not shown), which can be used to adjust an amount of light to which the image sensor 222 is exposed.

The camera assembly 200 further includes a controller 230, communicatively coupled with the ISA 220 and at least one motion sensor 240 for measuring camera motion. The controller may comprise a processing unit (e.g., a microprocessor, digital signal processor (DSP), application-specific integrated circuit (ASIC), a programmable gate array (PGA) or similarly programmable circuitry, which may be configured to interact with the other components of the camera assembly 200 as described herein. As such, the controller 230, may be configured to execute software stored in a non-transitory computer-readable medium.

The motion sensor 240 may comprise a gyroscope, an accelerometer, and/or any other type of motion sensor capable of determining rotational and/or translational movement of the camera assembly 200 (e.g., which reflect rotational and/or translational movement of an electronic device into which the camera assembly 200 is integrated, as shown in FIG. 1). In some embodiments, a camera assembly 200 may not have a motion sensor 240 dedicated to OIS. In such embodiments, the controller 230 may obtain motion data from other components of an electronic device into which the camera assembly 200 is integrated.

OIS is used to reduce blurring and other effects associated with movement of the camera assembly 200 during the time the image sensor 222 is capturing an image (e.g., the exposure period of a frame). Put generally, the motion sensor 240 (which may be configured to capture motion data at a certain frequency) provides motion data to the controller 230 regarding movement of the camera assembly 200. The controller 230 causes the actuator(s) 224 to move the lens 210 in the xy plane in a manner that compensates for the movement and minimizes blur in an image captured by the image sensor 222 caused by the motion of the camera assembly. Thus, an amount of OIS lens shift is proportional to the amount of movement.

For a camera assembly 200 that moves the lens 210 in a plane parallel to the image sensor 222 (e.g., the xy plane), there is a limitation of non-uniform image quality improvement. This is because lens 210 and/or image sensor 222 shift in the xy plane can only cause uniform image shift by so many pixels. This can be a particular challenge when the motion blur is due to roll (rotation about the optical axis 211), when good compensation would require non-uniform shift.

Roll Compensation

Figure 3:
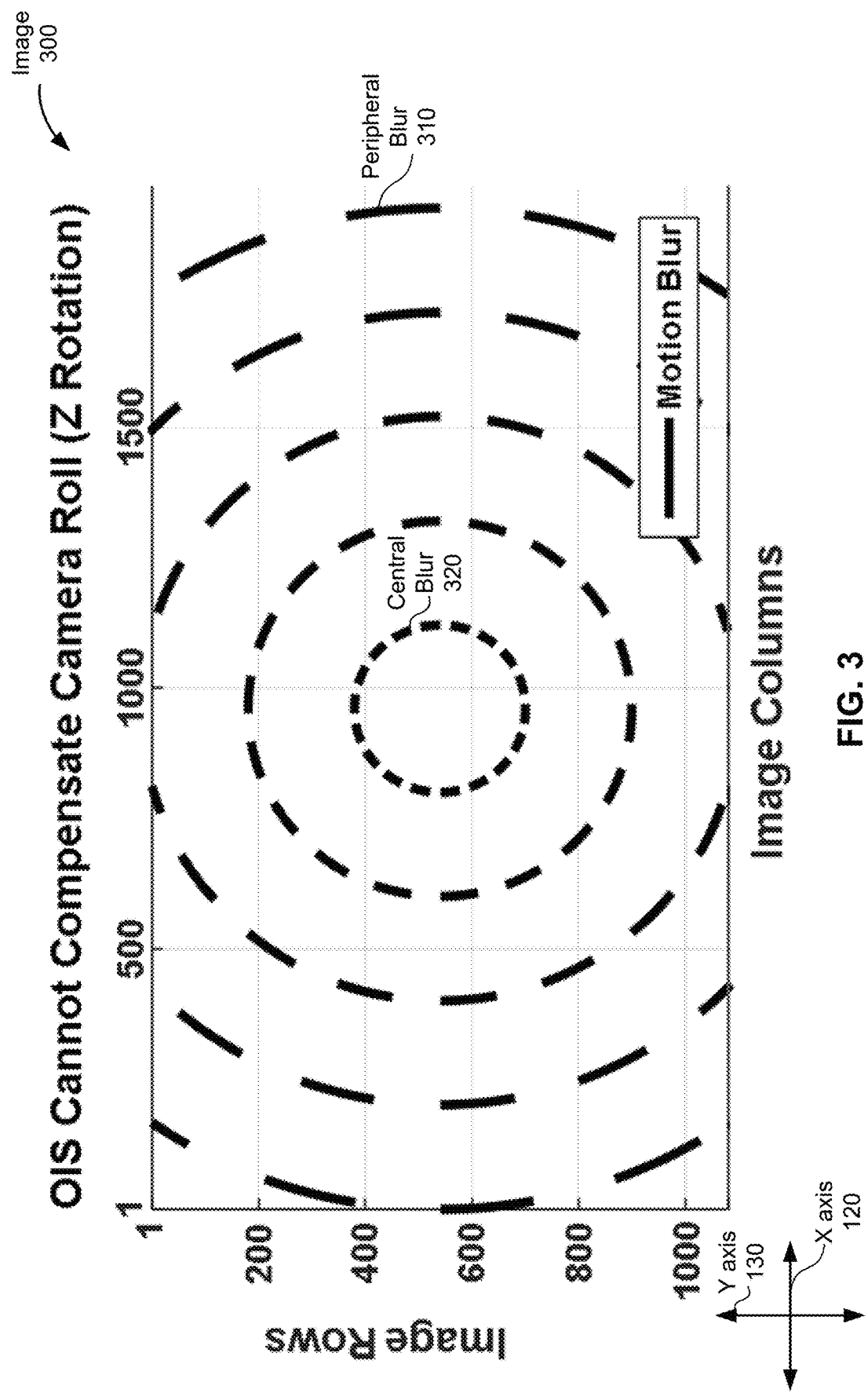
FIG. 3 is a graph illustrating example motion blur in an image due to roll movement during image capture.

FIG. 3 is a graph illustrating motion blur in an image 300, due to roll movement during image capture. Here, the image 300 comprises an array of pixels having (as an example) 1080 rows and 1920 columns. (Alternative embodiments may have different resolutions and/or aspect ratios.) Pixels in the image 300 correspond to sensor elements of the image sensor 222 disposed in corresponding rows and columns in the xy plane. Thus, image rows are aligned with the x-axis 120 and columns are aligned with the y-axis 130, as shown.

As shown, blurring near the periphery of the image is larger than blurring near the center of the image. (Peripheral blur 310 is larger than central blur 320.) Accordingly, an OIS correction due to lens shift in the xy plane, which corrects blurring uniformly, may undercompensate for blurring near the periphery of the image and/or overcompensate for blurring near the center of the image 300. However, if an "area of interest" within the image is determined, OIS lens shift may be modified to compensate for roll in a manner that moves the clearest area of the image 300 from the center of the image 300 to the area of interest. (This modification of lens shift is also called "lens shift adjustment.")

Figure 4:
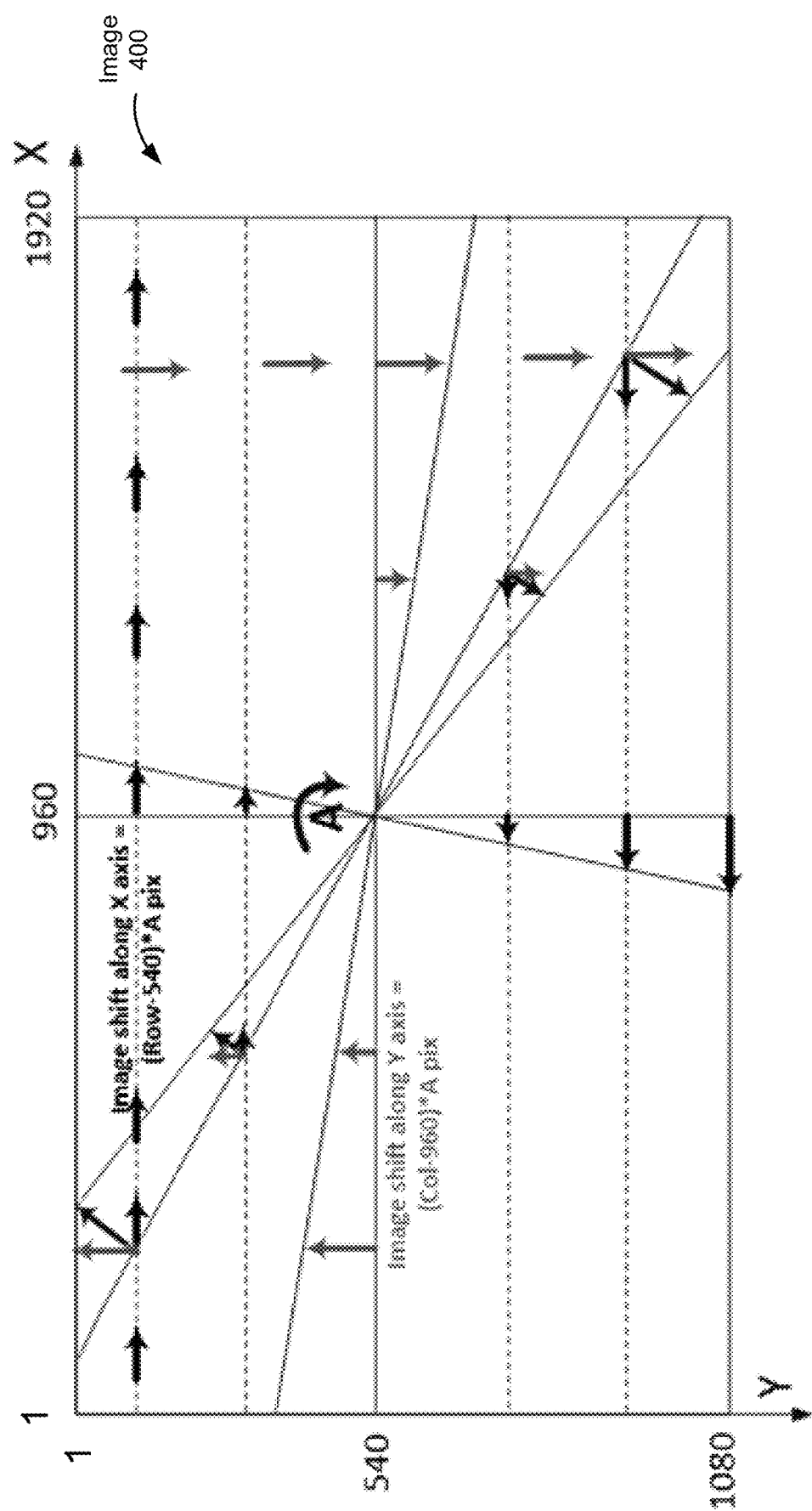
FIG. 4 is a graph illustrating how values for OIS lens shift adjustment may be determined in an image, according to an embodiment.

FIG. 4 is a graph illustrating how such lens shift adjustment may be achieved in an image 400. Here, rows and columns are numbered as illustrated, with row 1 at the top of image 400, and column 1 on the left-hand side. (Again, alternative embodiments may produce images with difference resolutions and/or aspect ratios.) A camera roll by A radians about the optical (z) axis causes motion blur dependent on the row and column of the image 400. As indicated in FIG. 4, image shift along the x-axis for a given row is calculated as [(Row−540)*A] pixels, and image shift along the y-axis for a given row is calculated as [(Col−920)*A] pixels, where Row is the row number and Col is the column number. The numbers 540 and 960 are significant because they are the respective row number and column number at the center of the image 400. Thus, an image having a different number of rows and/or columns would use a number representing half the rows and/or columns of that image. Generically, the middle row and middle column of the image 400 will be referred to herein as MidRow and MidColumn, respectively.

To prevent image shift (thus eliminate motion blur) in one specific point (e.g., the center of an area of interest) located at specific row (Row) and column (Col), the lens 210 is shifted in opposite direction by [(Row−MidRow)*A, (Col−MidColumn)*A] pixels. Where Zgyro(t) for a given time, t, is a measurement (e.g., obtained from motion sensor 240) of roll in rad/s, the corrective lens movement for roll compensation on the exposure is calculated as:

$$[(Row-MidRow),(Col-MidColumn)]*Zgyro(t), \quad (1)$$

where the Zgyro(t) units are rad/s.

As previously noted, this movement can occur in addition with lens movement due to other OIS functionality (e.g., 2-axis or 4-axis OIS). However, because the units of roll compensation (1) above units are in pixels/second, the term may need to be converted to rad/s before summing with terms from the other OIS functionality. For example, an adjusted value for OIS lens shift in a direction of the x-axis, that incorporates the roll compensation term (1), may be calculated in the 2-axis OIS as:

$$Xgyro_{adj}(t) = Xgyro(t) + Zgyro(t) * \frac{Row - MidRow}{FL}, \quad (2)$$

and in the 4-axis OIS as $$Xgyro_{adj}(t) = \quad (3)$$
$$Xgyro(t) + \frac{XTranslationSpeed(t)}{Distance} Zgyro(t) * \frac{Row - MidRow}{FL},$$

where Xgyro(t) is a measurement (e.g., obtained from motion sensor 240) of rotation causing blur a direction of the x-axis (i.e., rotation about the y-axis) used for traditional 2-axis OIS, and XTranslationSpeed(t) is a measurement of translation speed in a direction of the x-axis. Here, the roll compensation term is divided by the focal length of the lens, FL, in pixels, to convert the term to rad/s.

Similarly, an adjusted value for OIS lens shift in a direction of the y-axis may be calculated in the 2-axis OIS as $$Ygyro_{adj}(t) = Ygyro(t) + Zgyro(t) * \frac{Col - MidColumn}{FL}, \quad (4)$$

and in the 4-axis OIS as $$Ygyro_{adj}(t) = \quad (5)$$
$$Ygyro(t) + \frac{YTranslationSpeed(t)}{Distance} Zgyro(t) * \frac{Row - MidRow}{FL},$$

where Ygyro(t) is a measurement of rotation causing blur a direction of the y-axis (i.e., rotation about the x-axis), and YTranslationSpeed(t) is a measurement of translation speed in a direction of the y-axis.

Thus, the use of adjusted gain values as calculated in (2) and (4) can be used to not only provide 2-axis OIS, but also provide roll compensation by minimizing roll blur in the image for an area of interest centered at the intersection of row Row and column Col. The area of interest may be determined automatically by the electronic device 100 (e.g., centered at a location of a face within the image) or manually by a user of the electronic device.

Embodiments of roll compensation herein build upon the ability to perform such adjusted OIS lens shift to account for an area of interest in the image by further utilizing the actuator(s) 224 in a manner that accommodates more than one area of interest. An example of this is illustrated in FIGS. 5 and 6.

Figure 5:
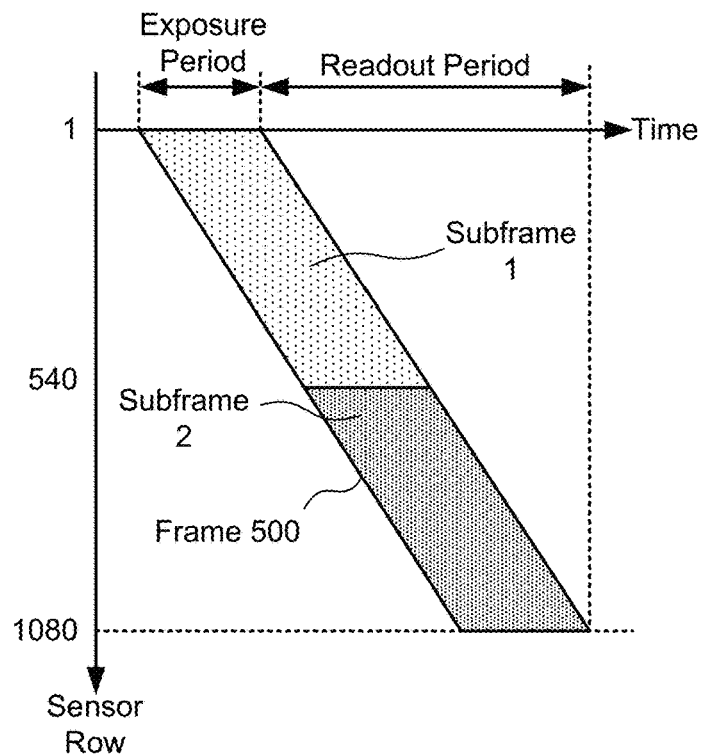
FIG. 5 is a frame graph showing how the image sensor may capture an image frame, according to an embodiment.
Figure 6:
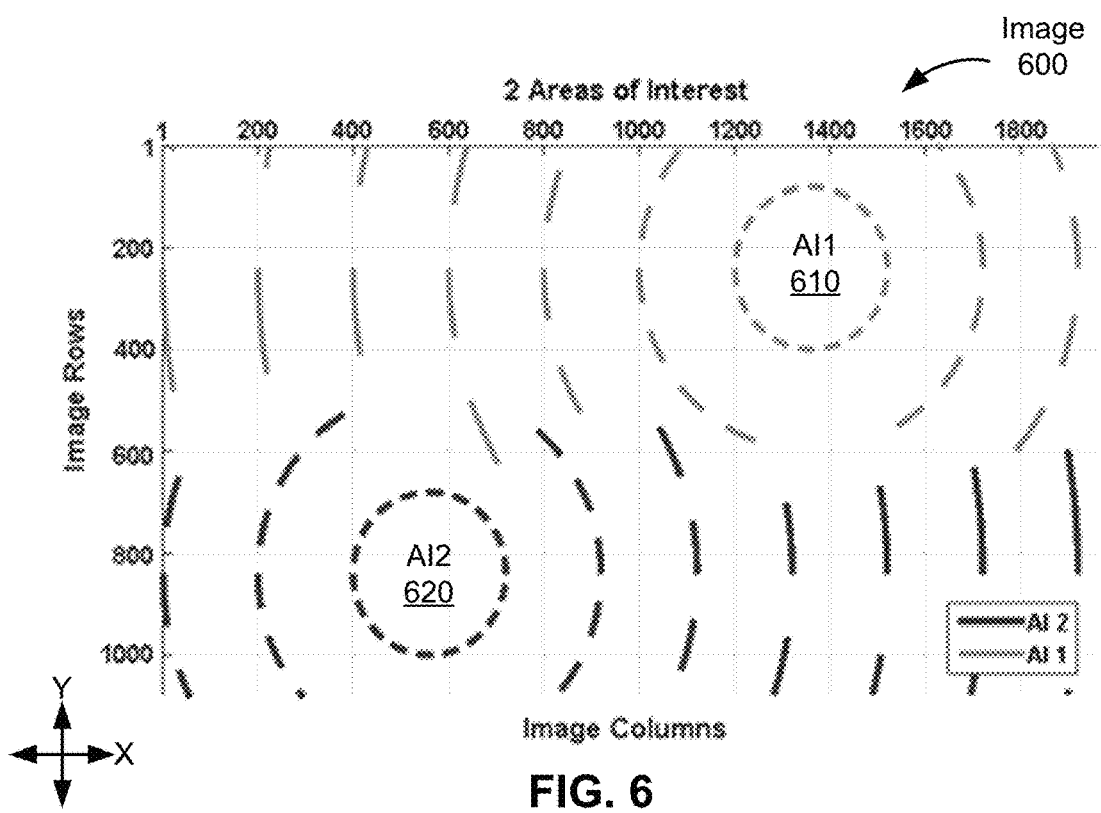
FIG. 6 is a graph illustrating motion blur for a roll-compensated image having two areas of interest.

FIG. 5 is a frame graph showing how the image sensor 222 captures an image frame by first subjecting rows to an exposure period, then reading out rows, row by row, during a readout period. As with other figures herein, FIG. 5 shows an example having 1080 rows (e.g., high definition (HD) video quality), although alternative embodiments may vary in the number of rows each frame has. The frame 500 is captured by a camera assembly having a rolling shutter. Therefore, the frame 500 begins with an exposure period followed by a readout period. More specifically, after exposure values for photosensitive sensor elements (pixels) in a row are reset, the row is subject to an exposure period, after which exposure values for the sensor elements are read and processed with downstream image processing circuitry. This exposure and readout occurs row-by-row, starting with row 1. Thus, the frame 500 begins with the exposure of the first row (row 1) and ends with the readout of the exposure values of the last row (row 1080).

It can be noted that, as used herein, the term "readout period" may refer to the time it takes to read the "relevant" rows of the frame that will be eventually captured in the image, which may be smaller than native amount of rows of the image sensor 222. For example, in the case of video cropping or digital zoom, only a subset of the rows of an image sensor 222 may be relevant (i.e., used in the captured image). And thus, the readout period corresponds to the period of time in which the subset of rows is read. Thus, as used herein, the term "readout period" may refer to this "effective" readout period.

In this example, the frame 500 is split into two subframes, Subframe 1 and Subframe 2, as illustrated, to accommodate roll compensation for two areas of interest at two locations within the image. The first area of interest is located within the first half of the rows, and the second area of interest is located in the second half of the rows. It will be understood, however, that subframes may be unequally divided such that one subframe is larger than the other. Moreover, a frame may be divided into more than two subframes to accommodate more than two areas of interest. In FIG. 5, OIS Zgyro term gain coefficient may be tuned during Subframe 1 in accordance with expressions (2) and (4) to provide roll compensation in the resulting image for a first area of interest, and then "retuned" during Subframe 2 to provide roll compensation for a second area of interest.

To provide the time synchronization to be able to retune the OIS Zgyro term gain coefficient during frame capture, the controller 230 can obtain, via an interrupt or other data related to frame capture, information regarding when the frame begins, and what the exposure and readout periods are for the frame. Where interrupts are unavailable to the controller 230, the controller 230 may predict or calculate the beginning of a frame based on single frame timing. Such frame prediction in video can remain accurate for minutes because frame period is typically very stable in video.

FIG. 6 illustrates the blur in the resulting image 600. As can be seen, roll blur is reduced in a first half of the image 600 with respect to a first area of interest, AI1 610, and also reduced in a second half of the image 600 with respect to a second area of interest, AI2 620. As previously noted, this concept may be extended to provide roll compensation for images having any a plurality of areas of interest. However, because sensor elements of the image sensor 222 are read out a row at a time, and because adjustments to the position of the lens 210 in the xy plane apply correction uniformly across the row, roll compensation may only be applied to areas of interest occurring on different rows of the image 600. As previously noted, areas of interest may be identified using any of a variety of techniques, including manual user input and/or an object detection algorithm (e.g., a face-detection executed by the electronic device 100).

Figure 7:
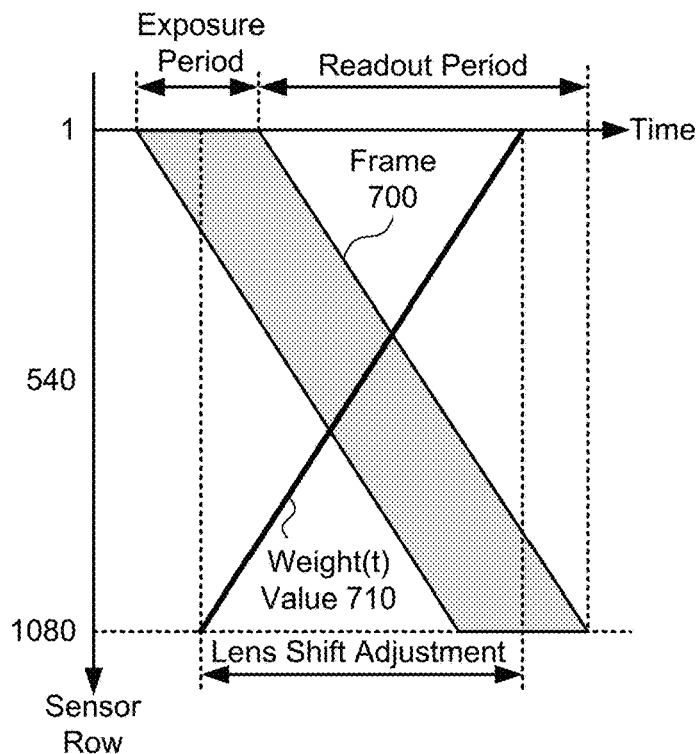
FIG. 7 is a frame graph, similar to FIG. 5, illustrating exposure and readout of sensor rows over the course of a frame.
Figure 8:
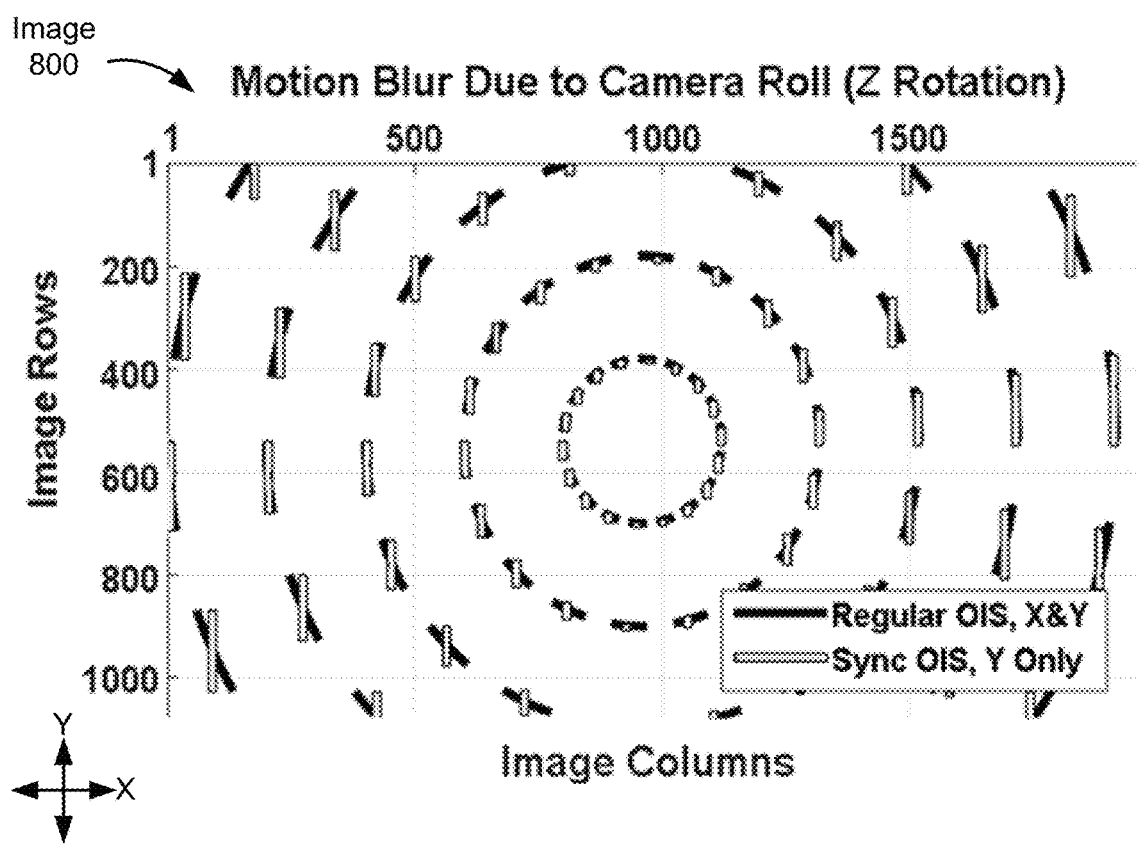
FIG. 8 is a graph illustrating how the roll compensation performed in FIG. 7 can reduce or eliminate motion blur in a direction along the x-axis of the resulting image due to roll movement, according to an embodiment.

According to some embodiments, these concepts may be extended not only to multiple areas interest, but to every row in an image. That is, rather than retuning the OIS Zgyro term gain coefficient for a small number of subframes, embodiments may continually retune the OIS Zgyro term gain coefficient, as rows of the image sensor 222 are being exposed, to provide roll compensation for every row. FIGS. 7 and 8 help illustrate how this may be done.

FIG. 7 is a frame graph, similar to FIG. 5, illustrating exposure and readout of sensor rows over the course of a frame 700. Here, however, rather than dividing the frame 700 in subframes and calculating an adjusted OIS shift using expressions (2) and (4) for each subframe, a time-dependent function, Weight(t), is applied. This causes the adjustment in OIS shift to vary over time, optimizing roll compensation as each row is exposed. FIG. 7 also superimposes the value of Weight(t), weight value 710, over the frame 700 to illustrate the change in value of Weight(t) over time. As can be seen, the Weight(t) may comprise a linear function.

In some embodiments, Weight(t) may be a time-varying substitute of the term (Row−MidRow)/FL in expression (2), replacing a static value for the row of an area of interest (Row) with a time-varying value (Row(t)). That is, expression (2) may be modified as follows:

$$Xgyro_{adj}(t) = Xgyro(t) + Zgyro(t) * Weight(t), \quad (6)$$

where $$Weight(t) = \frac{Row(t) - MidRow}{FL}. \quad (7)$$

The synchronization of OIS with the frame can allow for the determination of which row is exposed at any given moment in the frame. Thus, as opposed to FIG. 5, in which the OIS Zgyro term gain coefficient was synchronized with the frame capture to allow the OIS lens shift to be retuned halfway through the frame, the embodiment illustrated in FIG. 7 is more "tightly" synchronized to the exposure of individual rows throughout the frame. As indicated in FIG. 7, OIS lens shift adjustment may be applied approximately halfway through the exposure of each row, although alternative embodiments may vary.

With this information, and information regarding the number of rows in the sensor, the OIS can apply lens shift adjustment as shown. For an image sensor having 540 rows and an FL of 1500 pixels, the value of Weight(t) can vary from approximately −0.36 to 0.36. (Again, whether the value of Weight(t) is positive or negative for a given row may depend on the sign conventions used.)

FIG. 8 illustrates how the roll compensation performed in FIG. 7 can reduce or eliminate motion blur in a direction along the x-axis of the resulting image 800 due to roll movement. In FIG. 8, motion blur between "Regular OIS" (i.e., 2-axis OIS) and "Sync OIS" (i.e., 2-axis OIS, combined with the roll compensation of FIG. 7) are compared. As can be seen, Regular OIS does not compensate for motion blur due to roll movement, however Sync OIS greatly reduces motion blur in a direction along the x-axis.

Thus, tightly synchronized OIS lens shift adjustment as shown in FIG. 7 and described above can greatly reduce motion blur due to camera roll by eliminating the x component of motion blur. Moreover, this can additionally reduce or eliminate shutter warping: the distortion of objects along the y-axis due to camera rolling movement during the exposure period. That said, the vertical component of the motion blur remains. This is because exposure value of sensor elements the image sensor 222 are read out a row to time, allowing embodiments to optimize for each row, but not each column. Although optimization is not additionally adjusted for each column, providing OIS lens shift adjustment in this way can be beneficial in many applications. If nothing else, it reduces the amount of motion blur due to camera roll by expanding an area that is relatively unaffected by motion blur from a center circular area (e.g., as shown in FIG. 3) to a column that stretches from the top to the bottom of the image (as shown in FIG. 8).

Figure 9A:
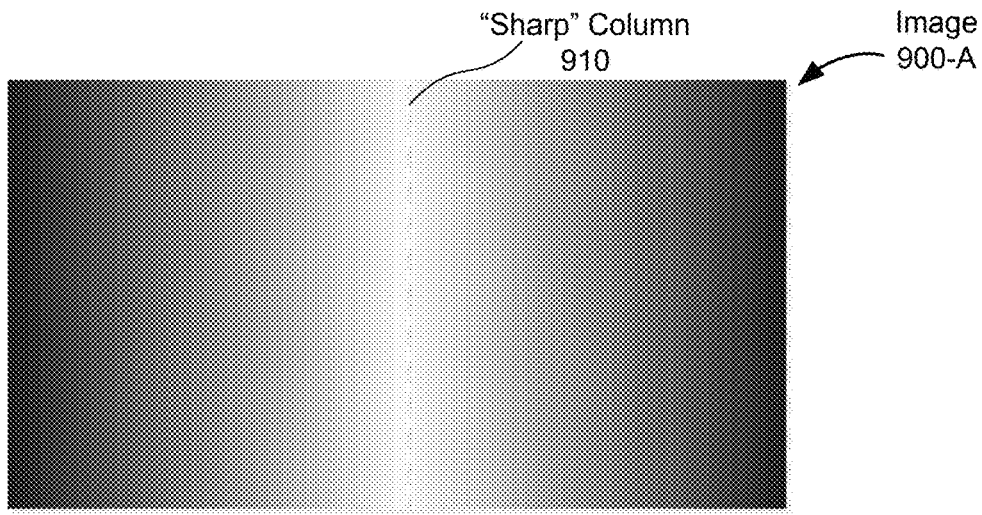
FIGS. 9A-9C are representations of roll-compensated images, according to some embodiments.

FIG. 9A is a representation of how the roll compensation described in FIGS. 7-8 affects motion blur within an image 900-A. Here, sharpness is illustrated in white, and blurriness is illustrated in black. As can be seen, the image 900-A includes a "sharp" column 910 at the center, with sharpness fading in both directions along the x-axis toward the periphery of the image 900-A. This can be helpful in instances in which there may be a plurality of areas of interest for the center of the image 900-A.

Depending on desired functionality, one or more aspects of this sharp column 910 may be adjusted by moving the lens 210 in a direction along the y-axis. For example, we can tilt and/or offset the sharp column 910 by adjusting and OIS Zgyro term gain coefficient in a direction along the y-axis similar to equation (6):

$$Ygyro_{adj}(t) = Ygyro(t) + Zgyro(t) * (Weight(t) * C1 + C2), \quad (8)$$

Here, we add scaling and offset values C1 and C2 to allow the sharp column 910 to be adjusted in various ways. For example, setting C1=1 and C2=0 so that roll adjustment term Zgyro(t)*Weight(t) is the same as in equation (6) results in a sloping column 920 with a 45 degree angle, as shown in image 900-B of FIG. 9B. Adjusting the value and sign of C1 can change the angle and direction of the slope. Adjusting the value of C2 can shift the column to the right or left, depending on the sign. FIG. 9C illustrates an image 900-C in which C1 and C2 to are adjusted to create a sloping, shifted column 930.

With this functionality, embodiments may adjust the sharp column 910 in a manner that produces a favorable output image. In some embodiments, this determination may be made dynamically, at or shortly prior to the frame. For example, in some embodiments, an electronic device 100 may perform facial recognition to identify faces in the image to be captured (e.g., using computer vision processing on a preliminary image taken before a frame). Locations of the faces within the image may be determined, and in some embodiments, prioritized. Areas of interest may then be determined, based on the locations and priorities, to align either vertically or sloping from top to bottom of the image, values of C1 and C2 may then be adjusted to cause the sharp column to align with the areas of interest. Other functions may also be used to cause an image to have a sharp column to be manipulated in other ways.

In some embodiments, special considerations may be made to help ensure the blur compensation techniques herein are not used in cases where different rows of the image sensor 222 may be exposed at the same time for frames captured in succession, such as in video, or where an exposure period is significantly large relative to a readout period.

Figure 10:
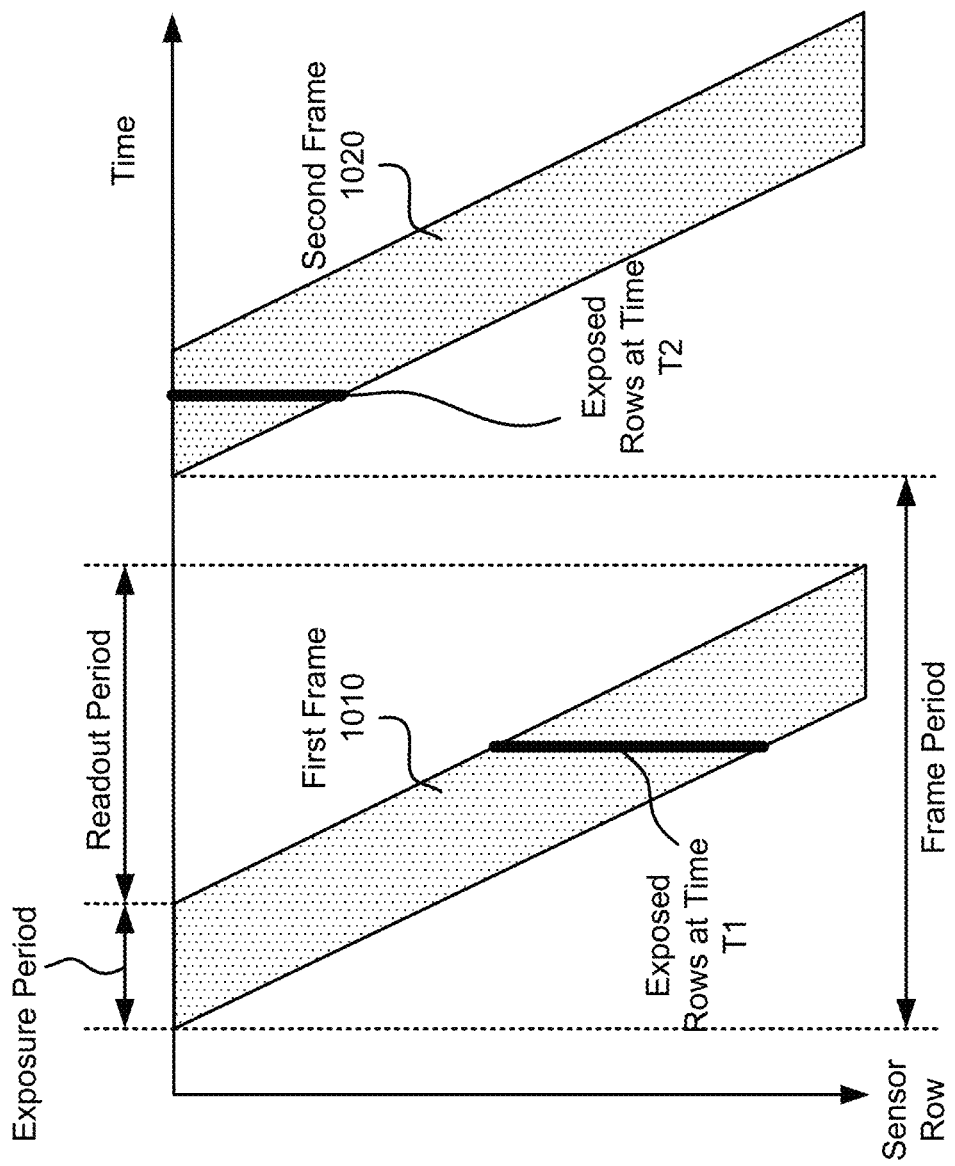
FIGS. 10 and 11 are frame graphs illustrating successively-captured frames.

FIG. 10 illustrates a frame graph to help illustrate this point. In FIG. 10, two frames, first frame 1010 and second frame 1020, are captured in succession. As can be seen, the exposure period, readout period, and frame period for the frames 1010, 1020 are such that there is no overlap in time between the frames. In other words (as shown by the exposed rows at time T1 and exposed rows at time T2, for example) at no time would different sets of rows of the image sensor be exposed for the different frames 1010, 1020, and at any given time, a relatively small percentage of the rows of the image sensor 222 are exposed. This may not be the case for frames having a relative long exposure period.

Figure 11:
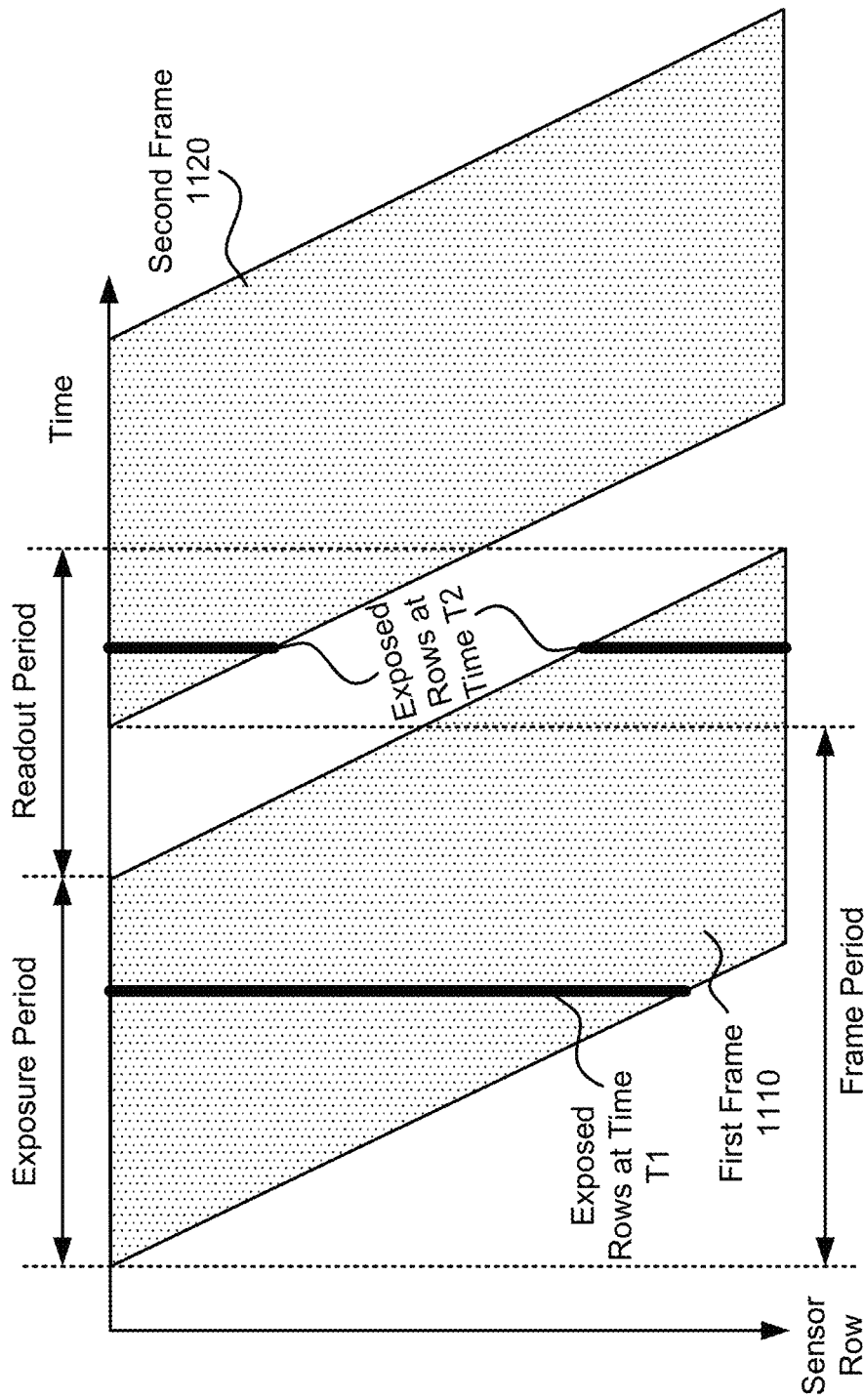

FIG. 11 illustrates a frame graph to help illustrate this point. Similar to FIG. 10, FIG. 11 shows two frames, First Frame 1110 and Second Frame 1120, captured in succession. Here, however, the exposure period is lengthened (e.g., due to low light and/or other conditions making an extended exposure period desirable). This may cause one or two issues to arise.

A first issue is that a long exposure period relative to the readout period can result in a large amount of rows exposed at a given time in a frame. At time T1, for example, nearly all rows are exposed. This can reduce the effectiveness of embodiments of tightly-synchronized OIS roll compensation techniques described herein, in which the lens position is based on the exposed rows, because more rows are exposed at once. This issue may arise in successively-captured frames (as shown) or single frames.

A second issue is that lengthening an exposure period can cause frames to overlap. For example, it may be desirable in some instances to maintain a certain frame rate (e.g., 30 frame per second (fps) video) even with longer exposure times. As such, there may be instances, such as at time T2 in FIG. 11, in which different rows of the image sensor 222 are exposed at the same time for different frames, presenting a problem for tightly-synchronized OIS roll compensation, where lens position is dependent on an exposed row. The two different sets of exposed rows would require the lens to be in two different positions.

To alleviate these issues, embodiments may employ the controller 230 or other processing unit to monitor the exposure period, readout period, and frame period of successively-captured frames. Where it is determined that frames might overlap and/or where an exposure period exceeds a threshold length relative to the length of the readout period (e.g., 50% or more, resulting in a large number of rows exposed simultaneously), the controller 230 or other processing unit may then decrease the length of the exposure period such that the length of the exposure period to a desired length (e.g., below the threshold length relative to the length of the readout period) and increase an ISO of the image sensor to at least partially compensate for the decrease in the length of the exposure period. Additionally or alternatively, if the camera assembly is capable of adjusting the aperture (i.e., reducing the focal ratio, or f-stop), the controller 230 or other processing unit may increase the aperture of the camera assembly to at least partially compensate for the decrease in the length of the exposure period. Additionally or alternatively, if the camera assembly is capable of adjusting the frame rate (i.e., increasing the frame period), the controller 230 or other processing unit may reduce the frame rate to ensure that frames do not overlap. Such adjustments may be performed, for example, in a still shot preview mode.

Blur Reduction

Many aspects of tightly-synchronized OIS lens shift adjustment for roll compensation described above may be applied to reduce blur in a direction along the y-axis due to pitch or yaw motion in 2-axis OIS and/or x and/or y translation in 4-axis OIS. (Again, y-axis blur may be due to either pitch or yaw, depending on the orientation of the camera assembly 200 and electronic device 100.) As previously noted, however, optimal OIS x and y lens shift on the image periphery is different than that of the image center. As such, this can affect the effectiveness of OIS in reducing blur for such pitch and yaw motion (e.g., using traditional 2-axis OIS techniques).

Referring again to FIG. 2, a simple ray-tracing diagram can be used to determine the projection of an object 250 on the image sensor 222. From this diagram, it can be determined that optimal OIS lens shift for object movement compensation on the image periphery will be larger by $\tan^2(A)$, where A is the angle of projection from the image center lens 210 and/or image sensor 222 shift in the xy plane can only cause uniform image shift by so many pixels, but good compensation would require non-uniform shift. Thus, lens shift cannot equally well compensate for blur at both the periphery and the center of an image, but maybe optimized for known location on the image sensor.

Thus, similar to techniques for tightly-synchronized OIS lens shift adjustment for roll compensation, OIS lens shift may be optimized for each row of an image sensor to compensate for pitch and yaw motion. However, similar to the techniques for OIS lens shift adjustment for roll compensation, optimization may be limited to removing blur in the direction of the y-axis without removing blur in the direction of the x-axis, due to the fact that sensor element readout of the image sensor occurs row by row.

If a distance of the row from the center row is defined as:

$$RowAngle(t) = \frac{Row(t) - 540}{FL}, \quad (9)$$

where Row(t) is the row being exposed (and t may be, for example, the approximate middle of the exposure time for Row(t)), this term can be used, along with the $\tan^2(A)$ optimization term, to adjust the OIS lens shift in a direction along the y-axis as follows:

$$Ygyro_{adj}(t) = Ygyro(t)*(1+\tan^2(RowAngle(t)). \quad (10)$$

Here, Ygyro(t) is the unadjusted value of y-axis OIS lens shift. The term $1+\tan^2(RowAngle(t))$ is an optimization for blur reduction at Row(t) for time t. However, it can be noted that approximations of this term may be used such as $1+RowAngle(t)^2$, a simple parabola, or similar term that may not necessarily involve trigonometry or squares. As with other techniques described herein, this technique of OIS lens shift adjustment is additive, and may therefore be utilized with 2-axis OIS or 4-axis OIS, and/or the previously-described roll compensation. Thus, the term Ygyro(t) in (10) may include y-axis OIS lens shift for these additional types of OIS.

Figure 12:
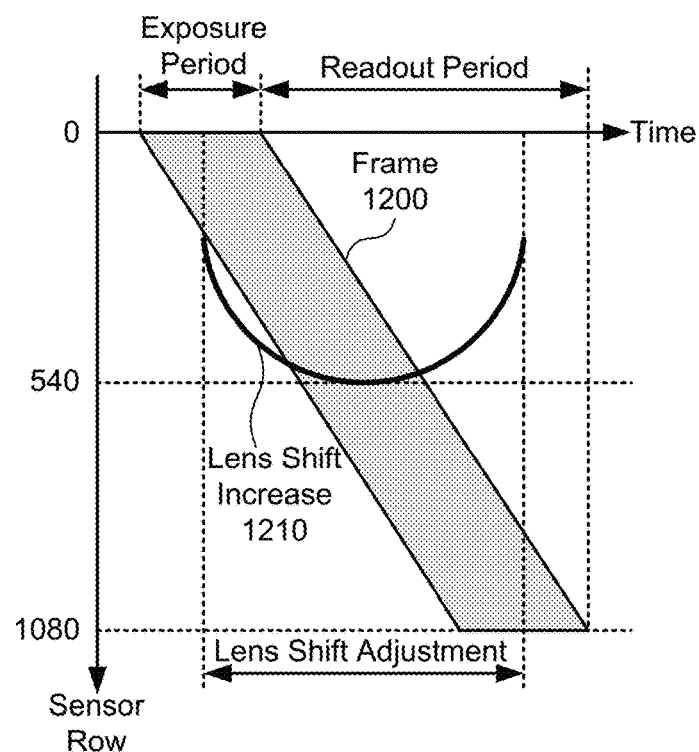
FIG. 12 is a frame graph and gain increase value, according to an embodiment.

FIG. 12 is a frame graph, similar to FIG. 7, illustrating exposure and readout of sensor rows over the course of a frame 1200. Similar to the time-dependent function Weight (t) in FIG. 7, the time-dependent function $(1+\tan^2(\text{RowAngle}(t))$ or its approximation causes the adjustment in OIS shift to vary over time, optimizing blur reduction as each row is exposed. Also shown in FIG. 12 is the lens shift increase 1210, represents the value of $(1+\tan^2(\text{RowAngle}(t))$ or its approximation as it varies over the frame 1200.

Similar to the process of FIG. 7, the synchronization of OIS with the frame 1200 can allow for the determination of which row is exposed at any given moment in the frame. Thus, the embodiment illustrated in FIG. 12 again represents "tight" synchronization to the exposure of individual rows throughout the frame. As indicated in FIG. 12, OIS lens shift adjustment may be applied approximately halfway through the exposure of each row, although alternative embodiments may vary. Synchronization may be obtained and/or estimated using the techniques described herein above, e.g., with regard to FIG. 7.

Figure 13:
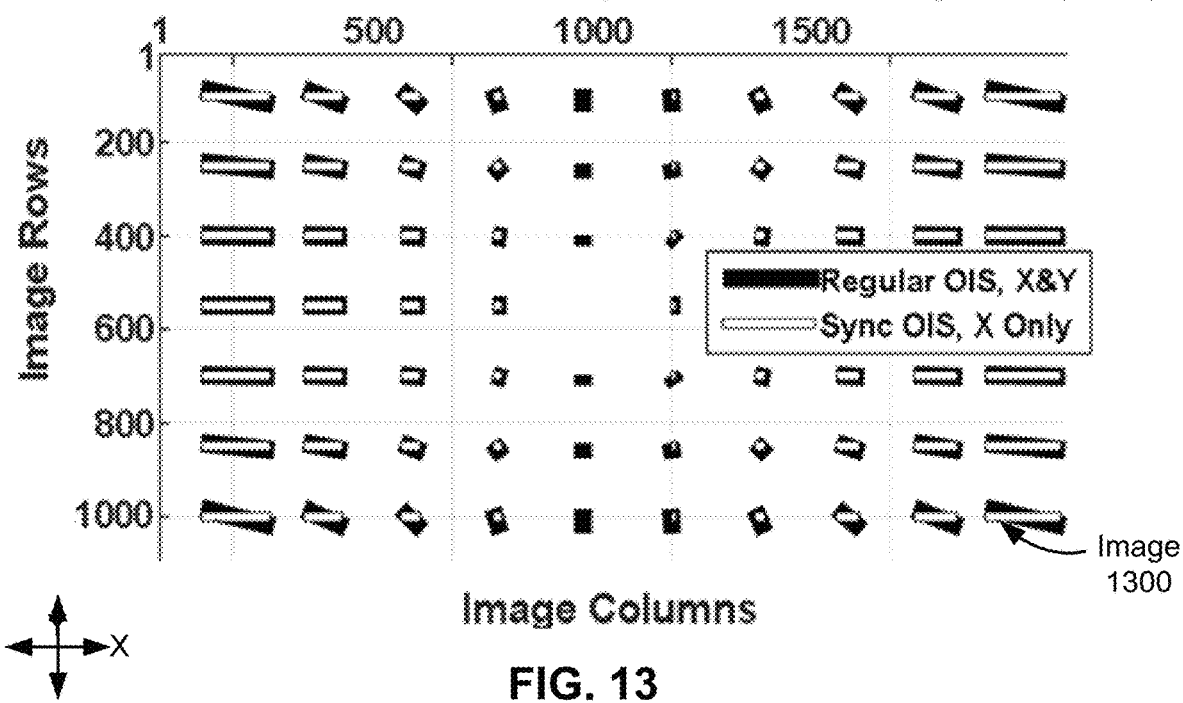
FIG. 13 is a figure illustrating how y-axis blur reduction can reduce or eliminate motion blur in a direction along the y-axis of the resulting image, according to an embodiment.

FIG. 13 is a figure illustrating how y-axis blur reduction, as described above with regard to FIG. 12, can reduce or eliminate motion blur in a direction along the y-axis of the resulting image 1300 due to roll movement. In FIG. 12, motion blur between "Regular OIS" (i.e., 2-4axis OIS) and "Sync OIS" (i.e., 2-4axis OIS combined with the y-axis blur reduction described herein) are compared, with respect to arbitrary pitch and yaw movement. As can be seen, Regular OIS has a relatively larger amount of blur, especially away from the center of the image (where traditional OIS is most effective). However Sync OIS greatly reduces motion blur in a direction along the y-axis.

Figure 9B:
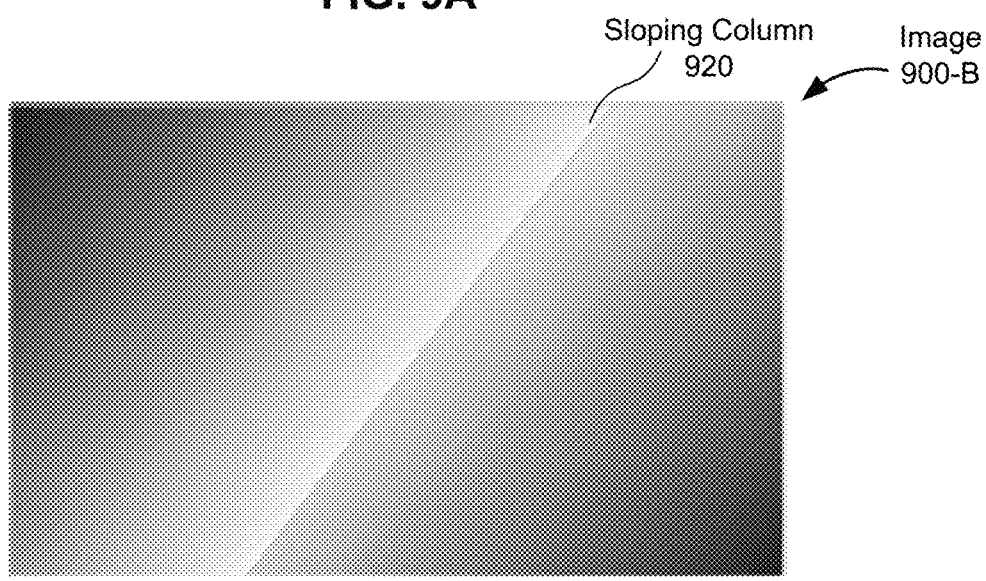
Figure 9C:
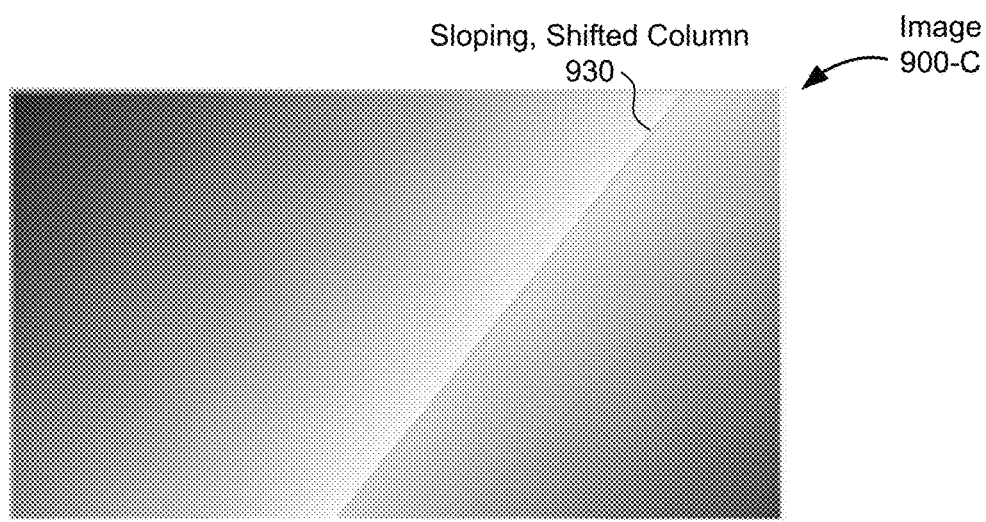

As can be seen from FIG. 13, this y-axis blur reduction can create a "sharp column" similar to that shown in FIGS. 8 and 9A Moreover, one or more aspects of this sharp column 910 may be adjusted, as shown in FIGS. 9B and 9C, for example, by moving the lens 210 in a direction along the x-axis over the course of the image 1300. For example, sharp column 910 can be tilted and/or offset the by adjusting OIS lens shift in a direction along the x-axis similar to equation (7): or its approximation $$X\text{gyro}_{adj}(t)=X\text{gyro}(t)*(1+\tan^2(\text{RowAngle}(t))*C1+C2), \quad (8)$$

Here, as with equation (8), scaling and offset values C1 and C2 are added to allow the sharp column 910 to be adjusted in various ways, as described above, including causing a slope (as shown in FIG. 9B), offset, or both (as shown in FIG. 9C). Again other functions may also be used to cause an image to have a sharp column that is manipulated in other ways.

As with roll compensation, special considerations may be made to help ensure the y-axis blur reduction is not used in cases where a large number of rows exposed at a given time in a frame and/or frames overlap, thereby reducing or eliminating the effects of the y-axis blur reduction. Again, embodiments may employ the controller 230 or other processing unit to monitor the exposure period, readout period, and frame period of successively-captured frames. Where it is determined that frames might overlap and/or where an exposure period exceeds a threshold length relative to the length of the readout period (e.g., 50% or more, resulting in a large number of rows exposed simultaneously), the controller 230 or other processing unit may then decrease the length of the exposure period such that the length of the exposure period to a desired length (e.g., below the threshold length relative to the length of the readout period) and increase an ISO of the image sensor to at least partially compensate for the decrease in the length of the exposure period. Additionally or alternatively, if the camera assembly is capable of adjusting the aperture (i.e., reducing the focal ratio, or f-stop), the controller 230 or other processing unit may increase the aperture of the camera assembly to at least partially compensate for the decrease in the length of the exposure period.

Figure 14:
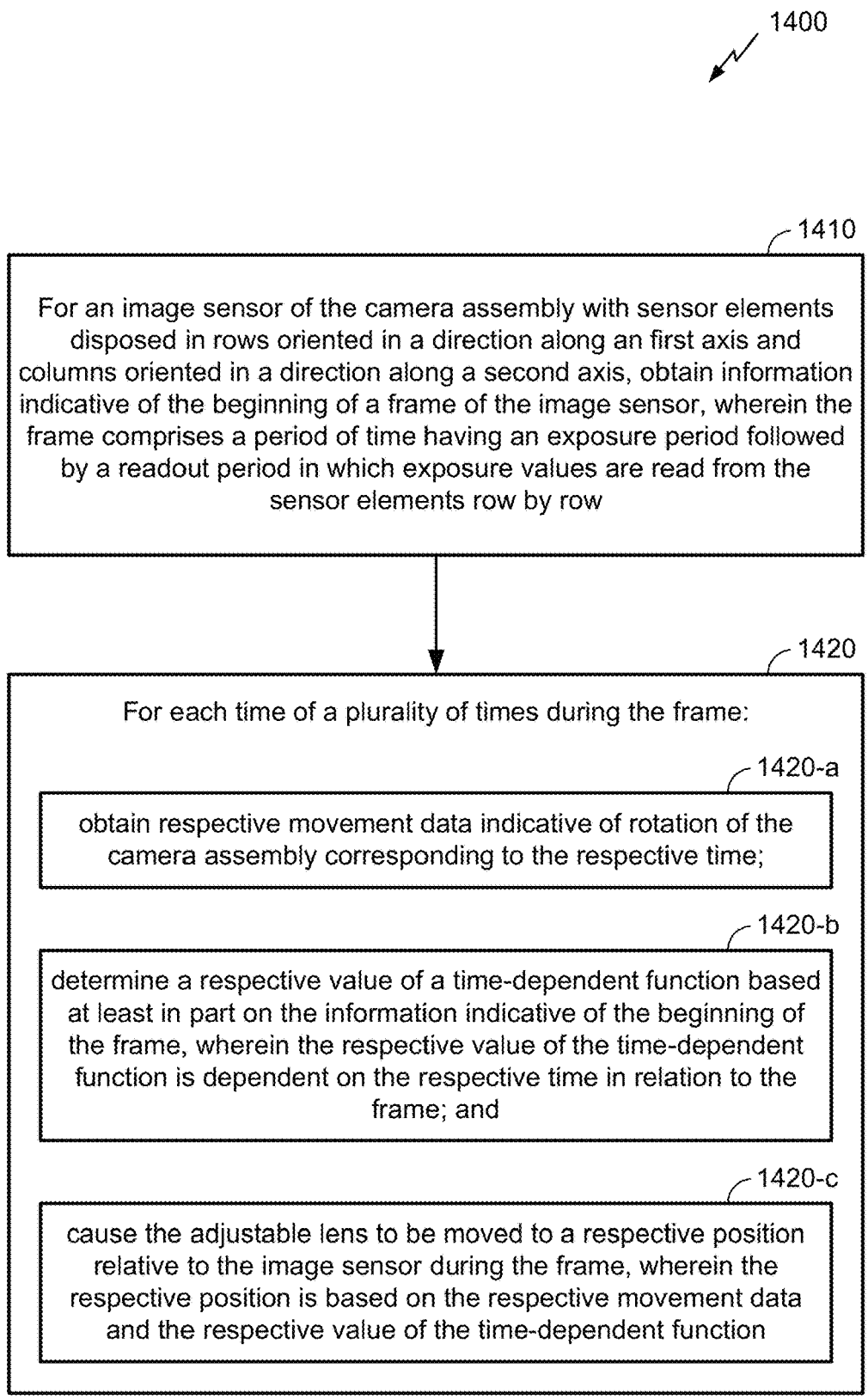
FIG. 14 is a flow diagram of a method of providing synchronized OIS in a camera assembly having an adjustable lens, according to an embodiment.

FIG. 14 is a flow diagram of a method 1400 of providing synchronized OIS in a camera assembly having an adjustable lens, according to an embodiment. Means for performing the method may include one or more components of the camera assembly, such as the camera assembly 200 in FIG. 2. In particular, the functionality described in the blocks of method 1400 may be performed by, for example, a processing unit (e.g., controller 230) capable of moving a lens in response to motion sensor data.

At block 1410, the functionality includes, for an image sensor of the camera assembly with sensor elements disposed in rows oriented in a direction along an first axis and columns oriented in a direction along a second axis, obtaining information indicative of the beginning of a frame of the image sensor, wherein the frame comprises a period of time having an exposure period followed by a readout period in which exposure values are read from the sensor elements row by row. As previously indicated, embodiments herein may be applied to camera assemblies having a rolling shutter in which sensor elements are read row by row, where rows are aligned in a direction along the first access (e.g., the x-axis), and columns are aligned in a direction along the second axis (e.g., the y-axis). Moreover, as noted elsewhere herein, obtaining information indicative of the beginning of a frame may comprise obtaining an interrupt or other direct indicator of the beginning of a frame. Additionally or alternatively, the beginning of a frame may be obtained from a calculation based on indirect data indicative of the beginning of a frame, such as the beginning of video capture.

At block 1420, several functions are performed for each time of a plurality of times during the frame. At block 1420-a, the functionality includes obtaining respective movement data indicative of rotation of the camera assembly corresponding to the respective time. Here, the data indicative of rotation of the camera assembly corresponding to the respective time may include roll, pitch, and/or yaw. (In the case of roll, techniques for roll compensation described herein may be implemented, and in the case of pitch and/or yaw, techniques for y-axis blur reduction may be implemented.)

At block 1420-b, the functionality includes determining a respective value of a time-dependent function based at least in part on the information indicative of the beginning of the frame, where the respective value of the time-dependent function is dependent on the respective time in relation to the frame As noted in the embodiments above, the time-dependent function may be at least partially based on a number of rows of sensor elements of the image sensor. In the case of roll compensation, for example, the time-dependent function may comprise a linear time-dependent weight (e.g., Weight (t)), and in the case of y-axis blur compensation, the time-dependent function may be nonlinear (e.g., $(1+\tan^2(\text{RowAngle}(t)))$, although alternative embodiments may vary.

Finally, at block 1420-c, the functionality includes causing the adjustable lens to be moved to a respective position relative to the image sensor during the frame, where the respective position is based on the respective movement data and the respective value of the time-dependent function. Depending on the type of rotation data, the time-dependent function may impact the position of the lens differently. For example, where the respective movement data is indicative of rotation of the camera assembly around a third axis (e.g., a roll motion about the z-axis) orthogonal to the first axis and the second axis, the location of the respective position in a direction along the first axis (e.g., the x-axis) is at least partially based on the respective movement data of the respective value of a time dependent function. As noted with regard to FIGS. 9A-9C, some embodiments may additionally move the lens along the y-axis over the course of the frame. That is, for each time of the plurality of times during the frame, the location of the respective position in a direction along the second axis is at least partially based on the respective value of the time-dependent function.

Additionally or alternatively, where the movement data is indicative of rotation of the camera assembly around a first axis (e.g., the x-axis, causing blurring a direction of the y-axis), the location of the respective position in a direction along the second axis (the y-axis) may be at least partially based on the respective movement data and the respective value of a time-dependent function. Again, as noted with regard to FIGS. 9A-9C, some embodiments may additionally move the lens along the y-axis over the course of the frame. That is, for each time of the plurality of times during the frame, the location of the respective position in a direction along the first axis is at least partially based on the respective value of the time-dependent function.

As indicated previously in the description, and illustrated in FIGS. 10-11, the method may further comprise, prior to the beginning of the frame, determining the length of the exposure period and a length of the readout period. This can help determine whether a number of rows exposed at a time during the frame may be too numerous for the synchronized OIS stabilization to work effectively. The method may include monitoring these values and proceeding once it is determined that the they fall within a favorable range. Thus, embodiments of the method 1400 may additionally or alternatively comprise determining that the length of the exposure period does not exceed a threshold length in relation to the length of the readout period, where determining the respective value of the time-dependent function for each time of the plurality of times during the frame is in response to determining that the length of the exposure period does not exceed the threshold length of the readout period. As previously noted, this threshold length may vary, depending on desired functionality. In some embodiments, the threshold length of the exposure period may be approximately 50% of the length of the readout period. In other embodiments, the threshold may be less than this (e.g., 40%, 30%, or less) or greater than this (e.g., 60%, etc.).

In instances where the exposure period exceeds the threshold, some embodiments may allow for the reduction of this exposure period and the increase of the ISO and/or widening of an aperture to keep the sensor elements sufficiently exposed. For example, in some embodiments, prior to the beginning of the frame, the method 1400 may further include determining that a length of the exposure period exceeds a threshold length in relation to a length of the readout period and, in response to determining that the length of the exposure period exceeds the threshold length of the readout period, decreasing the length of the exposure period such that the length of the exposure period does not exceed the threshold length of the readout period, and at least partially compensating for the decrease in the length of the exposure period by increasing an ISO of the image sensor, widening an aperture of the camera assembly configured to adjust an amount of light to which the image sensor is exposed, or both.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., controller 230) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method of providing synchronized optical image stabilization in a camera assembly having an adjustable lens, the method comprising:
   for an image sensor of the camera assembly with sensor elements disposed in rows oriented in a direction along an first axis and columns oriented in a direction along a second axis, obtaining information indicative of the beginning of a frame of the image sensor, wherein the frame comprises a period of time having an exposure period followed by a readout period in which exposure values are read from the sensor elements row by row; and
   for each time of a plurality of times during the frame:
      obtaining respective movement data indicative of rotation or translation of the camera assembly corresponding to the respective time;
      determining a respective value of a time-dependent function based at least in part on the information indicative of the beginning of the frame, wherein the respective value of the time-dependent function is dependent on the respective time in relation to the frame; and
      causing the adjustable lens to be moved to a respective position relative to the image sensor during the frame, wherein the respective position is based on the respective movement data and the respective value of the time-dependent function.

2. The method of claim 1, wherein the time-dependent function is indicative of which row of sensor elements of the image sensor is exposed at a given time.

3. The method of claim 2, wherein the time-dependent function is based on a number of rows of sensor elements of the image sensor.

4. The method of claim 1, wherein:
   the respective movement data is indicative of rotation of the camera assembly around a third axis orthogonal to the first axis and the second axis; and
   for each time of the plurality of times during the frame, a location of the respective position in a direction along the first axis is at least partially based on the respective movement data and the respective value of a time-dependent function.

5. The method of claim 4, wherein, for each time of the plurality of times during the frame, the location of the respective position in a direction along the second axis is at least partially based on the respective value of a time-dependent function.

6. The method of claim 1, wherein:
   the respective movement data is indicative of rotation of the camera assembly around a first axis; and
   a location of the respective position in a direction along the second axis is at least partially based on the respective movement data and the respective value of a time-dependent function.

7. The method of claim 6, wherein, for each time of the plurality of times during the frame, the location of the respective position in a direction along the first axis is at least partially based on the respective value of a time-dependent function.

8. The method of claim 1, further comprising, determining a length of the exposure period and a length of the readout period.

9. The method of claim 8, further comprising:
   determining that the length of the exposure period does not exceed a threshold length in relation to the length of the readout period;
   wherein determining the respective value of the time-dependent function for each time of the plurality of times during the frame is in response to determining that the length of the exposure period does not exceed the threshold length of the readout period.

10. The method of claim 8, further comprising:
    prior to the beginning of the frame, determining that a length of the exposure period exceeds a threshold length in relation to a length of the readout period; and
    in response to determining that the length of the exposure period exceeds the threshold length of the readout period, decreasing the length of the exposure period such that the length of the exposure period does not exceed the threshold length of the readout period, and at least partially compensating for the decrease in the length of the exposure period by:
    increasing an ISO of the image sensor,
    widening an aperture of the camera assembly configured to adjust an amount of light to which the image sensor is exposed, or
    both.

11. A camera assembly with optical image stabilization, the camera assembly comprising:
    a controller configured to be communicatively coupled with:
       an image sensor of the camera assembly with sensor elements disposed in rows oriented in a direction along an first axis and columns oriented in a direction along a second axis,
       one or more actuators configured to move an adjustable lens that focuses light onto the image sensor; and
       a motion sensor;
    wherein the controller is configured to:
       obtain information indicative of the beginning of a frame of the image sensor, wherein the frame comprises a period of time having an exposure period followed by a readout period in which exposure values are read from the sensor elements row by row; and for each time of a plurality of times during the frame:
obtain respective movement data, from the motion sensor, indicative of rotation or translation of the camera assembly corresponding to the respective time;
determine a respective value of a time-dependent function based at least in part on the information indicative of the beginning of the frame, wherein the respective value of the time-dependent function is dependent on the respective time in relation to the frame; and
move, with the one or more actuators, the adjustable lens to a respective position relative to the image sensor during the frame, wherein the respective position is based on the respective movement data and the respective value of the time-dependent function.

12. The camera assembly of claim 11, wherein the time-dependent function is indicative of which row of sensor elements of the image sensor is exposed at a given time.

13. The camera assembly of claim 12, wherein the time-dependent function is based on a number of rows of sensor elements of the image sensor.

14. The camera assembly of claim 11, wherein:
the respective movement data is indicative of rotation of the camera assembly around a third axis orthogonal to the first axis and the second axis; and
for each time of the plurality of times during the frame, the controller determines a location of the respective position in a direction along the first axis at least partially based on the respective movement data and the respective value of a time-dependent function.

15. The camera assembly of claim 14, wherein, for each time of the plurality of times during the frame, the controller determines the location of the respective position in a direction along the second axis at least partially based on the respective value of a time-dependent function.

16. The camera assembly of claim 11, wherein:
the respective movement data is indicative of rotation of the camera assembly around a first axis; and
the controller determines a location of the respective position in a direction along the second axis at least partially based on the respective movement data and the respective value of a time-dependent function.

17. The camera assembly of claim 16, wherein, for each time of the plurality of times during the frame, the controller determines the location of the respective position in a direction along the first axis at least partially based on the respective value of a time-dependent function.

18. The camera assembly of claim 11, wherein the controller is further configured to determine a length of the exposure period and a length of the readout period.

19. The camera assembly of claim 18, wherein the controller is further configured to determine that the length of the exposure period does not exceed a threshold length in relation to the length of the readout period;
wherein the controller is configured to determine the respective value of the time-dependent function for each time of the plurality of times during the frame in response to determining that the length of the exposure period does not exceed the threshold length of the readout period.

20. The camera assembly of claim 18, wherein the controller is further configured to:
prior to the beginning of the frame, determine that a length of the exposure period exceeds a threshold length in relation to a length of the readout period; and
in response to determining that the length of the exposure period exceeds the threshold length of the readout period, decrease the length of the exposure period such that the length of the exposure period does not exceed the threshold length of the readout period, and at least partially compensating for the decrease in the length of the exposure period by:
increasing an ISO of the image sensor,
widening an aperture of the camera assembly configured to adjust an amount of light to which the image sensor is exposed, or
both.

21. An apparatus comprising:
means for obtaining, for an image sensor of a camera assembly with sensor elements disposed in rows oriented in a direction along an first axis and columns oriented in a direction along a second axis, information indicative of the beginning of a frame of the image sensor, wherein the frame comprises a period of time having an exposure period followed by a readout period in which exposure values are read from the sensor elements row by row; and
means for, for each time of a plurality of times during the frame:
obtaining respective movement data indicative of rotation or translation of the camera assembly corresponding to the respective time;
determining a respective value of a time-dependent function based at least in part on the information indicative of the beginning of the frame, wherein the respective value of the time-dependent function is dependent on the respective time in relation to the frame; and
causing an adjustable lens to be moved to a respective position relative to the image sensor during the frame, wherein the respective position is based on the respective movement data and the respective value of the time-dependent function.

22. The apparatus of claim 21, wherein the time-dependent function is indicative of which row of sensor elements of the image sensor is exposed at a given time.

23. The apparatus of claim 22, wherein the time-dependent function is based on a number of rows of sensor elements of the image sensor.

24. The apparatus of claim 21, wherein
the respective movement data is indicative of rotation of the camera assembly around a third axis orthogonal to the first axis and the second axis; and
the apparatus further includes, for each time of the plurality of times during the frame, means for determining a location of the respective position in a direction along the first axis at least partially based on the respective movement data and the respective value of a time-dependent function.

25. The apparatus of claim 24, further comprising means for, for each time of the plurality of times during the frame, determining the location of the respective position in a direction along the second axis at least partially based on the respective value of a time-dependent function.

26. The apparatus of claim 21, wherein:
the respective movement data is indicative of rotation of the camera assembly around a first axis; and
the apparatus further includes means for determining a location of the respective position in a direction along the second axis at least partially based on the respective movement data and the respective value of a time-dependent function.

27. The apparatus of claim 26, further comprising means for, for each time of the plurality of times during the frame, determining the location of the respective position in a direction along the first axis at least partially based on the respective value of a time-dependent function.

28. The apparatus of claim 21, further comprising means for determining a length of the exposure period and a length of the readout period.

29. The apparatus of claim 28, further comprising:
means for determining that the length of the exposure period does not exceed a threshold length in relation to the length of the readout period;
wherein determining the respective value of the time-dependent function for each time of the plurality of times during the frame is in response to determining that the length of the exposure period does not exceed the threshold length of the readout period.

30. The apparatus of claim 28, further comprising:
means for, prior to the beginning of the frame, determining that a length of the exposure period exceeds a threshold length in relation to a length of the readout period; and
means for, in response to determining that the length of the exposure period exceeds the threshold length of the readout period, decreasing the length of the exposure period such that the length of the exposure period does not exceed the threshold length of the readout period, and at least partially compensating for the decrease in the length of the exposure period by:
increasing an ISO of the image sensor,
widening an aperture of the camera assembly configured to adjust an amount of light to which the image sensor is exposed, or
both.

31. A non-transitory computer-readable medium having instructions embedded thereon for providing synchronized optical image stabilization in a camera assembly having an adjustable lens, the instructions, when executed by one or more processing units, cause the one or more processing units to:
for an image sensor of the camera assembly with sensor elements disposed in rows oriented in a direction along an first axis and columns oriented in a direction along a second axis, obtain information indicative of the beginning of a frame of the image sensor, wherein the frame comprises a period of time having an exposure period followed by a readout period in which exposure values are read from the sensor elements row by row; and
for each time of a plurality of times during the frame:
obtain respective movement data indicative of rotation or translation of the camera assembly corresponding to the respective time;
determine a respective value of a time-dependent function based at least in part on the information indicative of the beginning of the frame, wherein the respective value of the time-dependent function is dependent on the respective time in relation to the frame; and
cause the adjustable lens to be moved to a respective position relative to the image sensor during the frame, wherein the respective position is based on the respective movement data and the respective value of the time-dependent function.

32. The non-transitory computer-readable medium of claim 31, wherein the time-dependent function is indicative of which row of sensor elements of the image sensor is exposed at a given time.

33. The non-transitory computer-readable medium of claim 32, wherein the time-dependent function is based on a number of rows of sensor elements of the image sensor.

34. The non-transitory computer-readable medium of claim 31, wherein the respective movement data is indicative of rotation of the camera assembly around a third axis orthogonal to the first axis and the second axis;
further comprising instructions that, when executed by one or more processing units, cause the one or more processing units to determine, for each time of the plurality of times during the frame, a location of the respective position in a direction along the first axis is at least partially based on the respective movement data and the respective value of a time-dependent function.

35. The non-transitory computer-readable medium of claim 34, further comprising instructions that, when executed by one or more processing units, cause the one or more processing units to determine, for each time of the plurality of times during the frame, the location of the respective position in a direction along the second axis is at least partially based on the respective value of a time-dependent function.

36. The non-transitory computer-readable medium of claim 31, wherein the respective movement data is indicative of rotation of the camera assembly around a first axis;
further comprising instructions that, when executed by one or more processing units, cause the one or more processing units to determine a location of the respective position in a direction along the second axis at least partially based on the respective movement data and the respective value of a time-dependent function.

37. The non-transitory computer-readable medium of claim 36, further comprising instructions that, when executed by one or more processing units, cause the one or more processing units to determine, for each time of the plurality of times during the frame, the location of the respective position in a direction along the first axis at least partially based on the respective value of a time-dependent function.

38. The non-transitory computer-readable medium of claim 31, further comprising instructions that, when executed by one or more processing units, cause the one or more processing units to determine a length of the exposure period and a length of the readout period.

39. The non-transitory computer-readable medium of claim 38, further comprising instructions that, when executed by one or more processing units, cause the one or more processing units to:
determine that the length of the exposure period does not exceed a threshold length in relation to the length of the readout period;
wherein determining the respective value of the time-dependent function for each time of the plurality of times during the frame is in response to determining that the length of the exposure period does not exceed the threshold length of the readout period.

40. The non-transitory computer-readable medium of claim 38,
further comprising instructions that, when executed by one or more processing units, cause the one or more processing units to:

prior to the beginning of the frame, determine that a length of the exposure period exceeds a threshold length in relation to a length of the readout period; and in response to determining that the length of the exposure period exceeds the threshold length of the readout period, decrease the length of the exposure period such that the length of the exposure period does not exceed the threshold length of the readout period, and at least partially compensating for the decrease in the length of the exposure period by:
increasing an ISO of the image sensor,
widening an aperture of the camera assembly configured to adjust an amount of light to which the image sensor is exposed, or
both.

* * * * *